(No Model.)

G. A. & A. A. LONG.
ANIMAL TRAP.

No. 335,081. Patented Jan. 26, 1886.

2 Sheets—Sheet 1.

WITNESSES
Villette Anderson
Grace M. Craig

INVENTORS
G. A. Long.
A. A. Long.
by Anderson & Smith
their ATTORNEYS (No Model.)

G. A. & A. A. LONG.
ANIMAL TRAP.

No. 335,081.

2 Sheets—Sheet 2.

Patented Jan. 26, 1886.

WITNESSES
Villette Anderson.
Grace M. Craig.

INVENTORS
G. A. Long,
A. A. Long.
by Anderson Smith
their ATTORNEYS

UNITED STATES PATENT OFFICE.

GEORGE A. LONG AND ALVIN A. LONG, OF NORTHFIELD, MASSACHUSETTS.

ANIMAL-TRAP.

SPECIFICATION forming part of Letters Patent No. 335,081, dated January 26, 1886.

Application filed March 28, 1885. Serial No. 160,473. (No model.)

*To all whom it may concern:*

Be it known that we, GEORGE A. LONG and ALVIN A. LONG, citizens of the United States, residing at Northfield, in the county of Franklin and State of Massachusetts, have invented certain new and useful Improvements in Animal-Traps; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
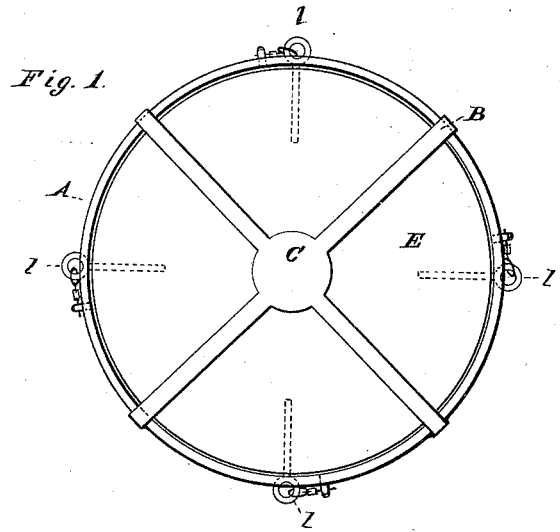
Figure 2:
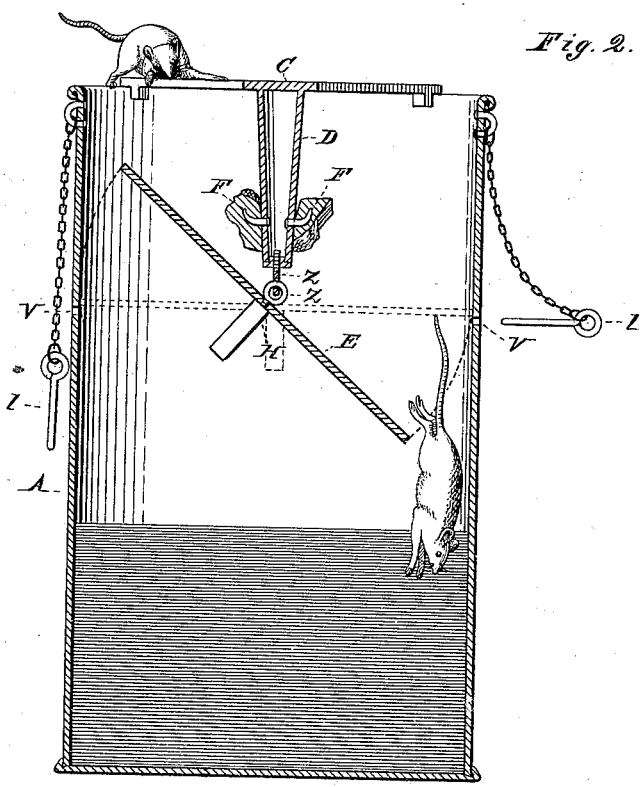
Figure 3:
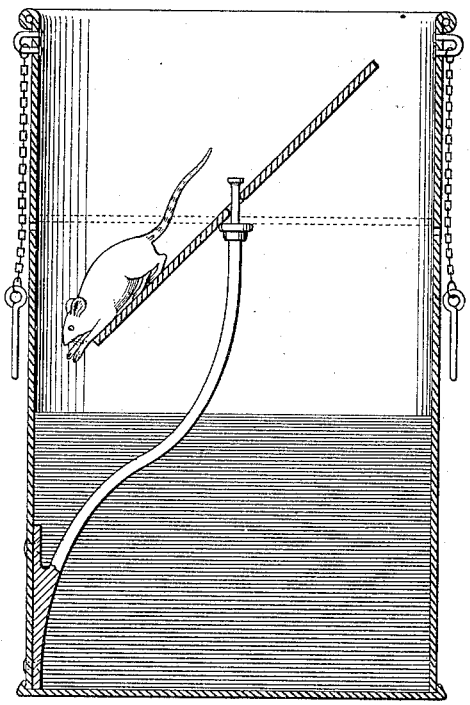

Figure 1 of the drawings is a representation of this invention, and is a top view. Fig. 2 is a vertical section.

This invention has relation to traps for rats, mice, or game; and it consists in the construction and novel arrangement of devices, all as hereinafter set forth, and pointed out in the appended claims.

The object of this invention is to provide a cheap and effective automatic trap, which, being without dangerous springs or weights, can be easily operated by a child.

In the accompanying drawings, the letter A designates a vessel of tin or other suitable material adapted to hold water, and being of proper size to suit the game to be caught.

B represents an open-work top having a cross-bar or cross-bars extending across the top of the vessel, said bar or bars being usually provided with a center, C, having a descending hanger arm, D, to the lower end of which is pivoted the tilting false bottom E at such a distance below the cross-bar that in order to reach the bait, which is designed to be attached to catches F of the hanger, the animals must descend upon the false bottom. This false bottom is usually provided on its under side with a weight-arm, H, and is designed to be balanced upon its pivot, so that when there is nothing upon it the level position will be maintained. The joint usually employed consists of two eyes or loops, Z Z, respectively on the hanger and on the false bottom, so that the latter will tilt readily in any direction. Below the false bottom the vessel is provided with a quantity of water, the surface of which should not be high enough to touch the edge of the false bottom when the latter is tilted by the animal thereon.

The trap is easily baited, and as it is self-setting nothing further is required than to pour into the vessel the proper quantity of water.

Small holes may be made around the side walls of the vessel at the end of the false bottom, as at *v*, to receive the pins *l*, which may be inserted under the false bottom when it is desired that the latter shall not be tilted by the game. The trap being arranged in this way and baited, the game may be allowed to eat the bait freely, and will acquire confidence, and can be afterward more easily captured when the holding-pins are removed to allow the false bottom to operate.

Having described this invention, what I claim, and desire to secure by Letters Patent, is—

1. The combination, with the vessel A, of the top cross-bar having the central hanger-arm, D, and the tilting false bottom E, joined to the hanger-arm by a free pivotal connection, whereby it is adapted to tilt in any direction, substantially as specified.

2. The animal-trap consisting of the vessel A, having an open cross-barred top formed with a central descending hanger-arm, provided with a tilting false bottom connected to the lower end of said hanger-arm, substantially as specified.

3. The animal-trap consisting of the vessel A, having the side perforations and pins described, the open cross-bar top having the hanger-arm extending downward, and the tilting false bottom pivoted to the lower end of said hanger-arm, substantially as specified.

In testimony whereof we affix our signatures in presence of two witnesses.

GEORGE A. LONG.
ALVIN A. LONG.

Witnesses:
MARY A. POMEROY,
LAURA L. POMEROY.